July 30, 1940.  W. J. PODBIELNIAK  2,209,577
CENTRIFUGAL FLUID TREATING APPARATUS
Filed June 25, 1936   5 Sheets-Sheet 1

INVENTOR.
WALTER J. PODBIELNIAK,
BY
ATTORNEY.

July 30, 1940.    W. J. PODBIELNIAK    2,209,577
CENTRIFUGAL FLUID TREATING APPARATUS
Filed June 25, 1936    5 Sheets-Sheet 2
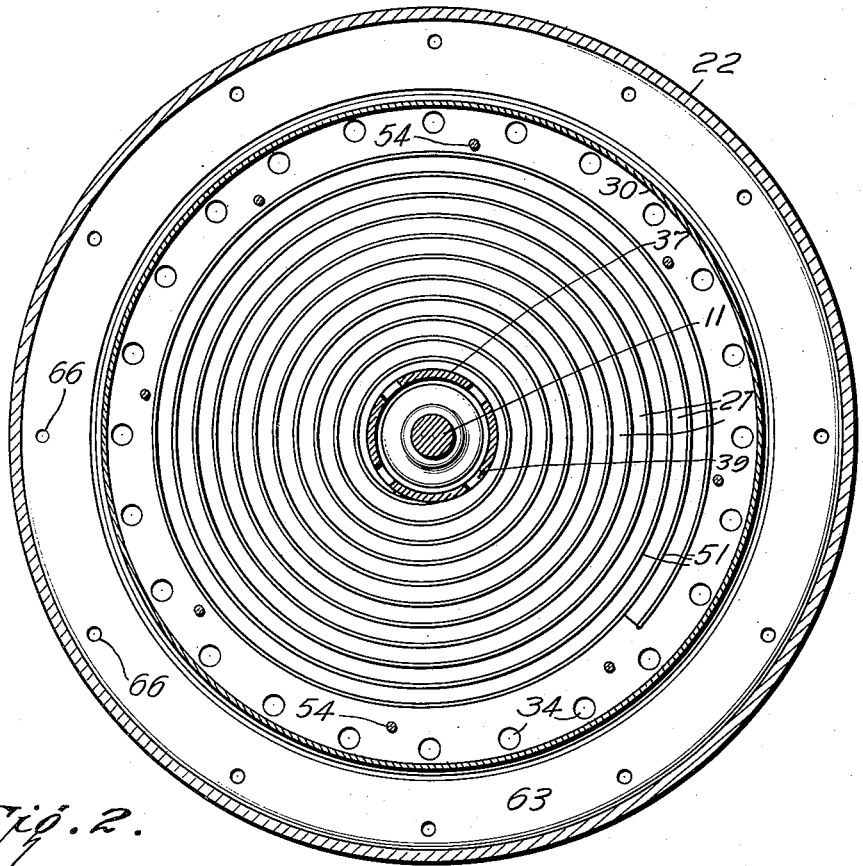
Fig. 2.
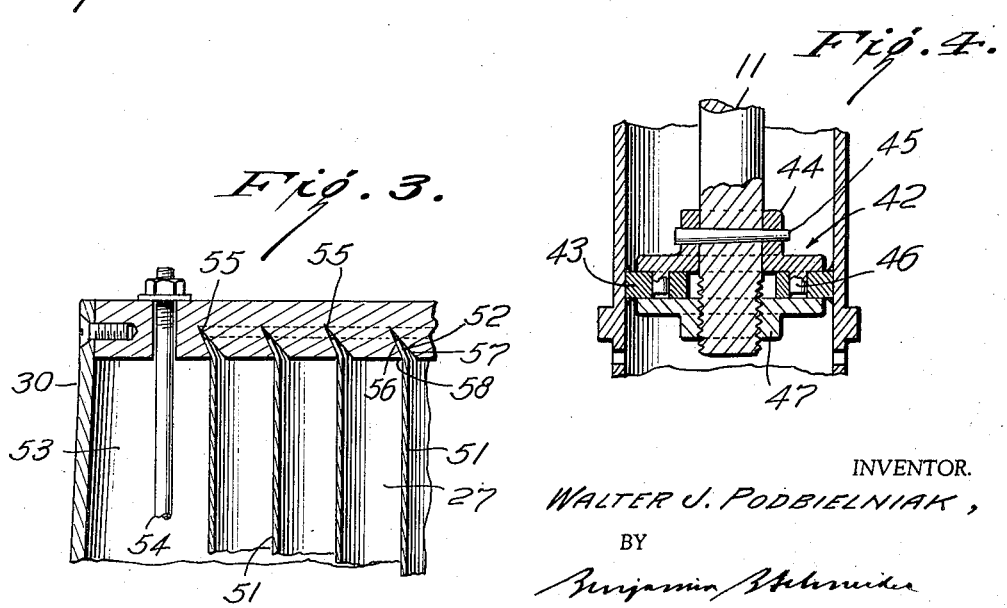
Fig. 3.
Fig. 4.
INVENTOR.
WALTER J. PODBIELNIAK,
BY
ATTORNEY.

July 30, 1940.  W. J. PODBIELNIAK  2,209,577
CENTRIFUGAL FLUID TREATING APPARATUS
Filed June 25, 1936  5 Sheets-Sheet 3

INVENTOR.
WALTER J. PODBIELNIAK,
BY Benjamin B. Schneider
ATTORNEY.

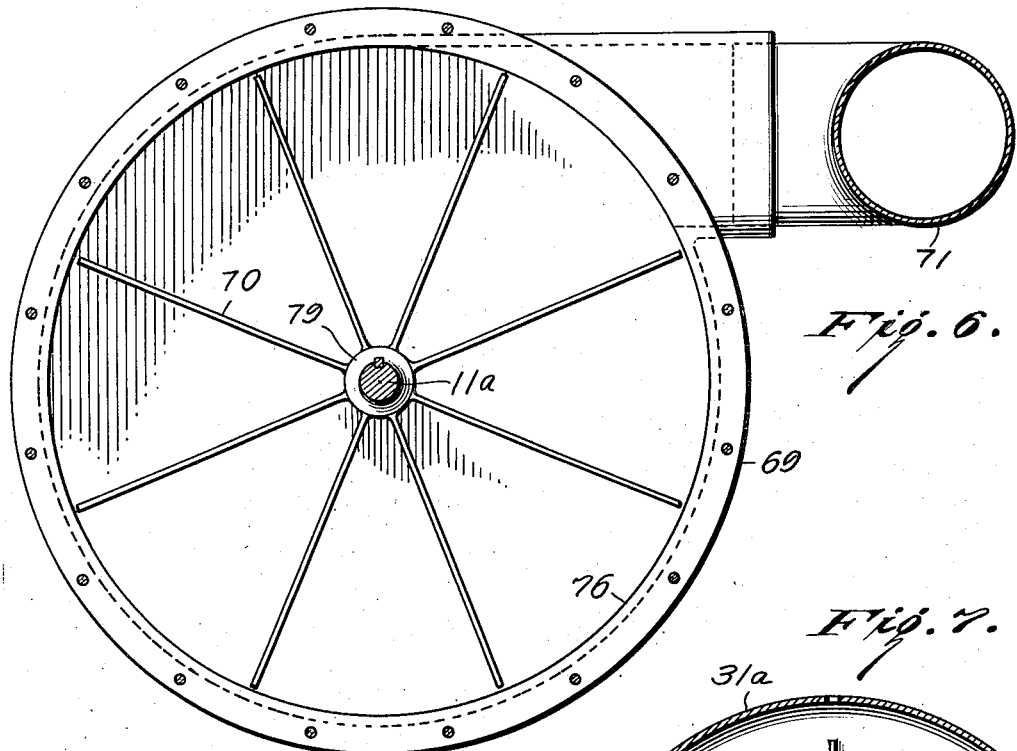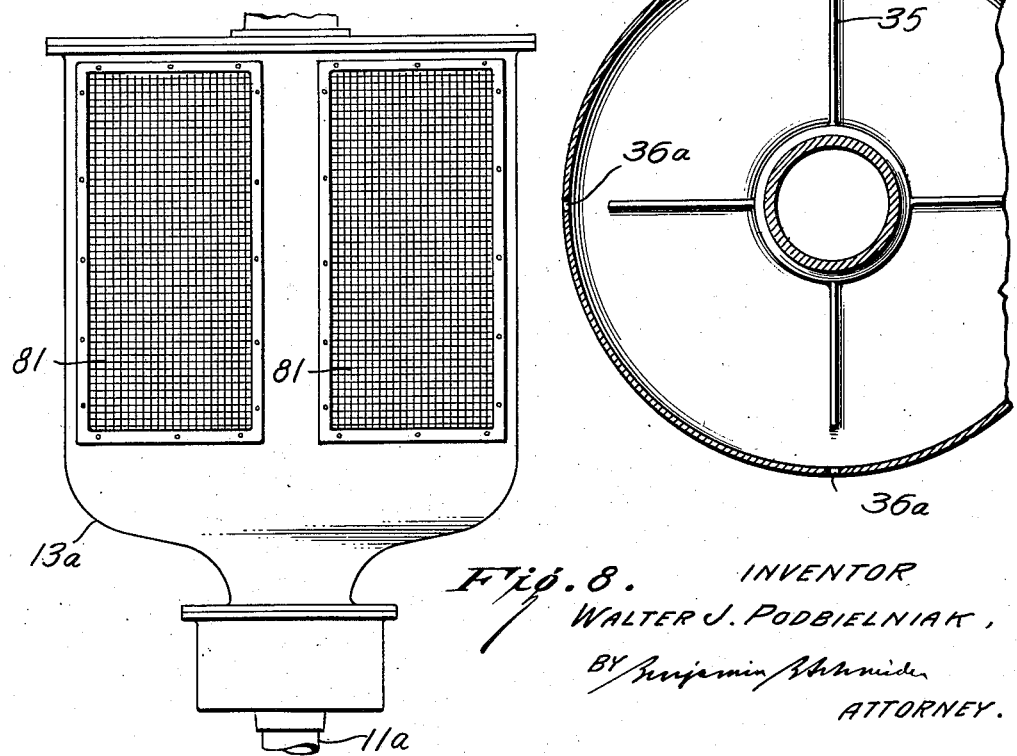

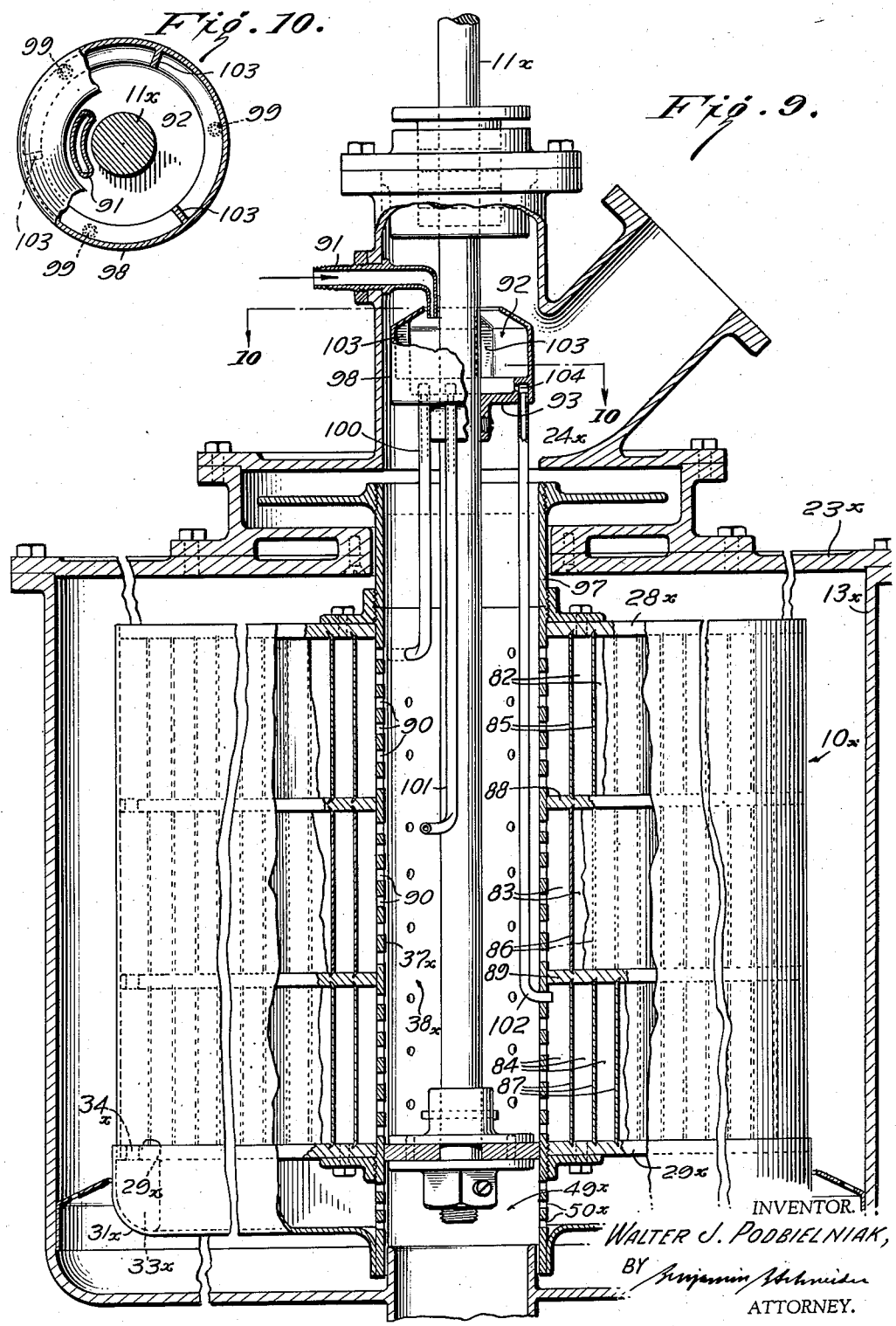

Patented July 30, 1940

2,209,577

UNITED STATES PATENT OFFICE 2,209,577

CENTRIFUGAL FLUID-TREATING APPARATUS

Walter J. Podbielniak, Chicago, Ill., assignor to Benjamin B. Schneider, Chicago, Ill.

Application June 25, 1936, Serial No. 87,224

32 Claims. (Cl. 261—83)

This invention relates to the art of effecting counter-current exchange between fluids of different densities for the purpose of absorption, scrubbing and conditioning, heat exchange and the promotion of chemical reactions; and more particularly to the art of fractional distillation of volatile fluids having constituents of different boiling points wherein a counter-current contact of a fluid and a lighted fluid is effected.

In my prior Patent No. 2,004,011, issued June 4, 1935, and my prior applications Serial No. 5,059, filed February 5, 1935 and Serial No. 19,327, filed May 1, 1935, Patent No. 2,044,996, issued June 23, 1936, I have described methods and apparatus for the counter-current treatment of fluids of different densities, for reaction, fractional distillation or heat exchange purposes etc. wherein a more effective counter-current treatment and more accurate fractionation or distillation may be effected. In employing the methods and apparatus therein set forth, counter-current flow between a liquid condensate or reflux and a lighter fluid or vapor is brought about by means of centrifugal force, the reflux or heavier liquid being thereby caused to flow outwardly through a tube or passageway of increasing radius, counter-current to an inwardly moving lighter fluid or vapor. The passageway may be built of very great length without involving prohibitive construction costs and without encountering the limitations in length, cross-sectional area, velocities and throughput which are prime considerations when gravity is depended upon to secure the desired counter-current flow. A much greater efficiency in fractionation, absorption, chemical or contact action may accordingly be secured than in apparatus of the types hitherto known.

The present invention relates to improvements in the methods and apparatus of the character shown in my above-mentioned patent and applications as well as providing methods and apparatus especially suitable for fractionation, air conditioning, gas and liquid contact and the like.

The present invention will be readily understood from the following specification and the accompanying drawings which form a part of my invention. It is to be understood that my invention is not to be considered as limited to the specific forms shown and described except as included in the accompanying claims which form a part of my specification.

Referring to the drawings:

Fig. 2 is a transverse, sectional view taken on the line 2—2 of Fig. 1;

Fig. 3 is an enlarged fragmentary detail showing the construction of my novel rotor;

Fig. 4 is an enlarged fragmentary detail, partly in section, of a coupling means embodied in my apparatus;

Fig. 6 is a transverse, sectional view taken on the line 6—6 of Fig. 5;

Fig. 7 is a transverse, sectional view taken on the line 7—7 of Fig. 5 and showing the lower fan blades;

Fig. 8 is a front elevation of an apparatus embodying my invention and showing a modified form of the housing employed in Fig. 5.

Fig. 9 is a longitudinal, vertical sectional view through an apparatus constituting a preferred embodiment of my invention; and Fig. 10 is a detailed section taken along the line 10—10 of Fig. 9.

Figure 1:
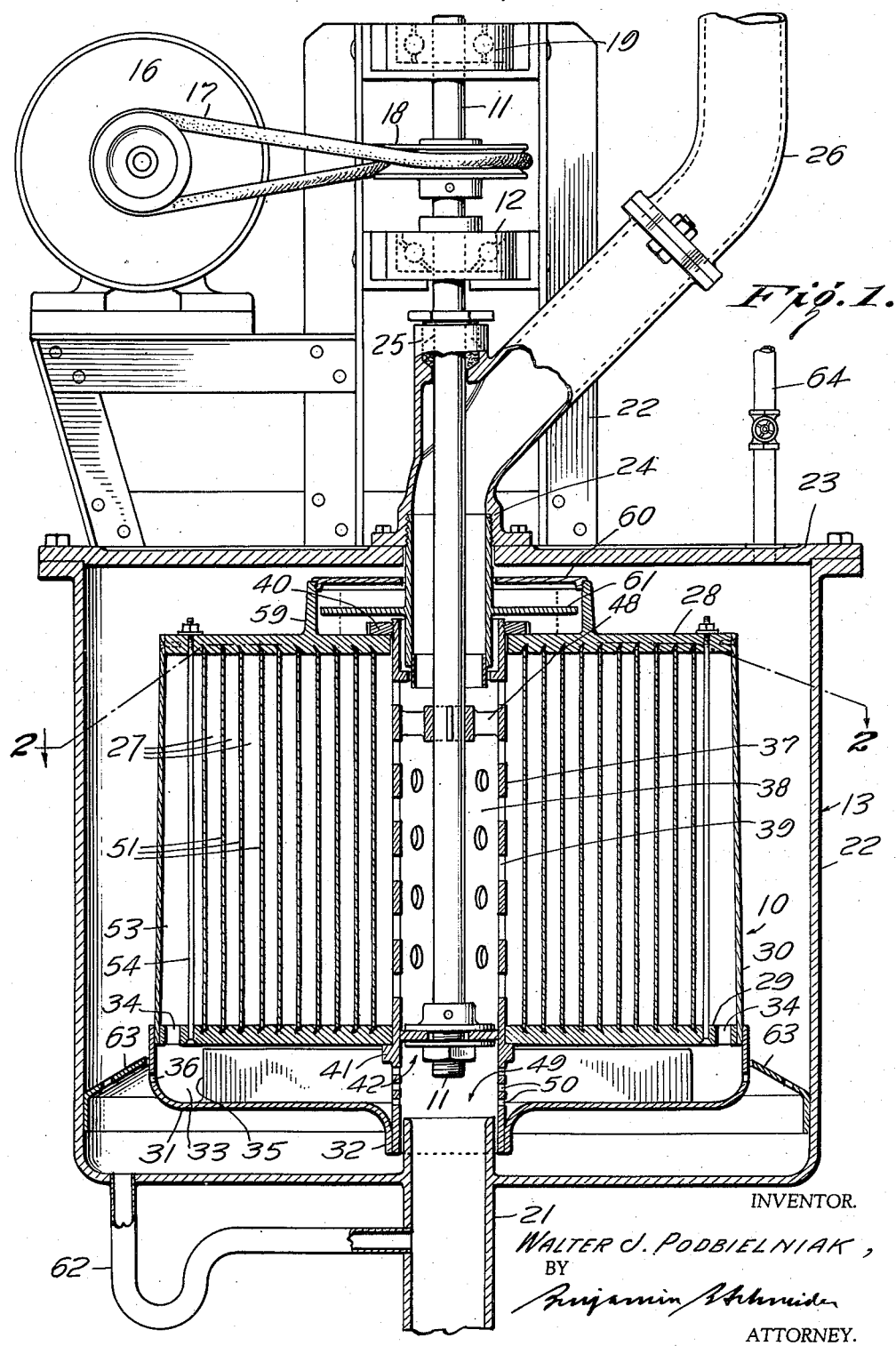
Fig. 1 is a longitudinal, vertical sectional view through an apparatus suitable for carrying the invention into effect.

Referring more particularly to Figs. 1 and 2 of the drawings, a rotor 10 is provided in which the fluids to be treated are brought into contact by a counter-current movement set up by centrifugal force. The rotor 10 is within a stationary housing 13 and is mounted for rotation on a vertical rotatable shaft 11. This rotatable shaft is suspended from and adapted to rotate in a combination thrust and radial bearing 12, suitably located above and outside of the stationary housing 13.

Power for rotating the shaft 11 is transmitted from some suitable source such as the motor 16, belt 17 and pulley 18 secured to the shaft 11. In order to further steady the rotation of the shaft 11 an auxiliary radial bearing 19 may be provided at the outer end of the shaft and above the pulley 18. The bearings 12 and 19 are secured to some suitable stationary frame 22 in order to support the shaft 11. The frame 22, which may also serve as a support for the motor 16, may be secured to and supported by the cover plate 23 of the housing 13 or may be otherwise suitably supported.

Gases or vapors to be subjected to treatment are introduced into the apparatus through an inlet conduit 21 which extends centrally into the lower part of the housing.

The housing 13 is fluid-tight and comprises casing 22 of generally cylindrical form, to which is removably secured the cover plate 23. The plate 23 is provided approximately centrally thereof with an opening in which an outlet conduit 24 is secured by a fluid-tight joint. The lower end of the conduit 24 surrounds the shaft 11 and is provided with an opening having a stuffing box 25 through which the shaft extends upwardly. Stuffing box 25 prevents the escape of fluids from the conduit along the shaft. The upper end of the conduit 24 extends away from the shaft 11 and communicates with an exit pipe 26 for treated vapor or gas and through which reflux liquid or other liquid may be supplied, if desired.

As stated above, the rotor 10 is located within the housing 13 and is provided with a spiral passageway 27 of increasing radius which establishes communication between the inlet 21 and the outlet 24.

The rotor 10 is in the form of a drum and is provided with circular end plates 28 and 29 and a cylindrical shell or casing 30 which is secured to the peripheries of the end plates 28 and 29. The casing 30 thus provides a chamber within the rotor in which the spiral passageway 27 is formed in a manner to be hereinafter described. As shown in Fig. 1 the casing 30 may flare slightly in the downward direction in order to employ the aid of the centrifugal force set up by rotation of the rotor along with gravity to urge liquids on the surface of the casing to flow downwards.

The lower end of the rotor 10 is provided with a closure member 31 having a cylindrical flange which is secured along its rim to the end plate 29 in any desirable manner. Closure member 31 is provided with a central opening, formed with a downward directed cylindrical extension 32, which is in alignment with the inlet conduit 21. The member 31 forms with the end plate 29 of the rotor a chamber or passageway 33. Openings 34 are provided adjacent the outer periphery of end plate 29 to establish communication between the chamber 33 and the spiral passageway 27. The passageway 33 permits the flow of vapors therethrough which enter by the inlet 21 and in order to assist this flow, impeller or booster fans 35 may be provided within the chamber. The member 31 is provided with small peripheral openings 36 to permit the discharge of reflux liquid that enters chamber 33 during the operation of the apparatus. The casing 30 and closure member 31 form an exterior mantle which is useful to reduce windage and pressure drop across the rotor or between the kettle vapors and the vapors leading to the condenser. They may however be omitted for simplicity at a slight sacrifice of power and where the advantages of use do not offset their extra cost and complications.

Within the rotor 10 and adapted to rotate therewith is a centrally disposed hollow, cylindrical hub 37 which surrounds shaft 11 and is spaced therefrom to form a space 38. The cylindrical hub 37 is provided with perforations or openings 39 which establish communication between the spiral passageway 27 and the outlet 24. The lower end of the hub 37 is fitted within the cylindrical extension 32 of member 34 and the upper end thereof is secured to end plate 28, as by a lock-nut 40. A collar 41 is provided on hub 37 which abuts against end plate 29 and which in cooperation with nut 40 prevents axial movement of the hub.

In order to prevent the flow of vapor from inlet conduit 21 directly into space 38 and thus into outlet 24, a closure member designated as a whole by 42 (Figs. 1 and 4) is provided within the hub 37. To form the closure member 42, a flat ring 43, is welded, brazed or otherwise secured to the inner surface of hub 37 at or near the level of end plate 29. A collar 44 is fixed to shaft 11 immediately above ring 43, for example by set screws or pin 45. The collar 44 is provided with downwardly projecting pins 46 which enter apertures in ring 43 so that the ring and collar are securely interlocked against relative rotation. A second collar 47 is secured to shaft 11 below ring 43. Collar 47 has a threaded engagement with shaft 11 and is screwed up against ring 43 to engage its lower face. It is thus apparent that closure member 42 prevents the flow of vapor directly into space 38 and also serves to rigidly secure hub 37 to the shaft 11. As a further securing means, a spider 48 is secured to hub 39 and shaft 11 near the upper end of hub 37.

By means of closure member 42, a chamber 49 is provided in the lower end of hub 37, which chamber is in direct communication with inlet 21. Openings 50 are provided in the lower end of hub 37 forming chamber 49 to establish communication between this chamber and the chamber 33 communicating with spiral passageway 27.

As shown in Figs. 1 and 3, the spiral passageway 27 is suitably formed by means of a spirally-wound metal sheet 51, the edges of which are fixed in spirally-formed grooves 52 to plates 28 and 29 in a fluid-tight manner as is more clearly shown in Fig. 3, and is hereinafter described. The space between the windings of sheet 51 constitutes the spiral passageway 27. The space 53 between the shell 30 and the outermost winding of sheet 51 constitutes the light fluid inlet to the spiral passageway 29. The inner end of the spiral passageway opens into the space surrounding the hub 37, and communicating through openings 39 with the space 38.

As stated above, the spirally wound sheet 51 is secured to plates 30 and 31 to form fluid-tight joints. In my prior application Serial No. 5,059, a fluid-tight joint was formed by packing material packed in the bottoms of the grooves in the end plates. In my present invention as illustrated in Fig. 3, the grooves 52 in the inner faces of end plates 28 and 29 are so formed that they make a fluid-tight joint with the edges of sheet 51 when drawn together, as by the action of the stay bolts 54, which extend through the plates 28 and 29. To accomplish this, the grooves 52 are formed V-shaped, the sides making an acute angle 55 at the inner end or bottom of the groove. The walls 56 and 57 of the grooves slope away from the axis of rotation. The outer wall 56 of the groove makes a slight angle, say of 10°, with a line drawn parallel to the axis of rotation of plate 28. As plates 28 and 29 are drawn forcibly together by the stay bolts 54, the edge of sheet 51 contacts the inner face 57 of groove 52 and is thereby wedged against the corner 58 of the groove and towards the angular bottom thereof, so that, as the action of the bolt is continued, the edge of sheet 51 is bent outwardly and the extreme edge of sheet 51 is jammed into the angle of groove 52 to form a fluid-tight joint. It is thus apparent that in this form of construction no sealing material is necessary and the possibilities of a leaking joint completely eliminated. Furthermore, the rotor may be readily disassembled for repairs or replacement.

If the distance between the plates 28 and 29 is so great as to permit "bellying" or "whipping" of the sheets 21 or of a width whereby defects in flatness of the sheet are exaggerated, an intermediate plate can be provided to which the sheets can be secured in the manner hereinabove described. In instances where the intermediate plate may be deemed necessary, suitable provisions must be provided to insure the uniform distribution of reflux liquid in the chambers of the rotor so formed. To accomplish this, suitable openings may be provided in this intermediate plate through which the reflux liquid may pass to the chambers to equalize the supply of liquid in each chamber. However, other suitable means obvious to one skilled in the art may be provided to accomplish this uniform distribution of the liquid in the rotor.

In a preferred embodiment of my invention to be hereinafter described, there is shown a rotor subdivided into rotor sections or chambers and provided with a suitable distributing arrangement to insure the uniform distribution of reflux liquid in the chambers of the rotor so formed.

Liquid available in the operation, such as condensate or other heavy fluid is made use of in a seal to prevent the escape of vapors between the upper end of the hub 37 and the lower end of the outlet conduit 24.

As illustrated in Fig. 1 the seal comprises a liquid seal chamber formed by a circular boss 59 welded or brazed to the top plate 28 of rotor 10 and a cover plate 60. The inner periphery of plate 60 is spaced from the stationary conduit 24 and the liquid seal chamber is accordingly adapted to rotate with the rotor. A stationary disk 61 is secured to the conduit 24 and hub 27 collects in the chamber formed by plate 28, boss 59 and plate 60 and is thrown outward during rotation of the rotor 10 against boss 59 by centrifugal force to form an annular body of liquid into which the edge of disk 61 extends to prevent vapors from passing through the seal. An insulating jacket (not shown) may be provided about the liquid seal to prevent undue transfer of heat from the kettle vapors into the liquid of the seal and at the same time permit sufficient vaporization of the seal liquid to prevent condensation of the kettle vapors in the upper part of the seal.

In the operation of the apparatus shown in Figs. 1 and 2 in accordance with my invention, the mixed vapors from a still or other suitable source enter the space 49 from the conduit 21 and pass through the openings 50 into passageway 33. The rotor and its associated parts are rotated to develop a centrifugal force which may be of a desired order although I prefer that it be substantially in excess of the force of gravity. In general, I have found it advisable to employ conditions of operation, rates of rotation and the like so that the centrifugal force effective in the operation is equivalent to five or more times the force of gravity. A speed of rotation of 600 to 2000 R. P. M. or higher has been found suitable. The gases and vapor from conduit 21 are supplied under such pressure differential that they pass with the centrifugal force set up by rotation through the passageway 33, then through openings 34 to the outer end of the spiral passageway 27. They then pass through the passageway against the centrifugal force set up by rotation and counter-current to heavier fluid or reflux, and into the space 38 and out through conduit 24. Some of the vapors will, in general, condense in passageway 27 to form reflux liquid and additional reflux may be formed in outlets 24, 26 or in a reflux condenser to which conduit delivers, or reflux liquid may be supplied to the rotor in any desirable manner.

Reflux from conduit 26 will run through conduit section 24 and into space 38 whence it passes, due to centrifugal force, through openings 39 into the spiral passageway 27. Reflux entering and formed in the passageway 27 flows outwardly therethrough in a film or sheet against one wall of the passageway due to centrifugal force, counter-currently to the vapors and gases flowing inwardly therethrough toward space 38. The relatively denser and heavier reflux liquid therefore contacts and scrubs the relatively lighter gases and vapors, the two streams of fluid being brought together intimately at their surfaces of contact by the centrifugal force applied. Reflux liquid discharges from the outer end of the passageway 27, collects against the inner face of shell 30 and flows through openings 34 into space 33 in member 31. As set forth above, shell 30 may flare slightly in a downward direction, so that the centrifugal force aids gravity in moving the reflux downward. Reflux then discharges from rotor 10 through opening 36 into the housing 13.

The openings 36 are of such size in proportion to the average amount of reflux to be discharged therethrough that a ring of reflux liquid is normally maintained against the inner face of member 31 during operation of rotor 10 to seal the openings 36 against escape of vapors from the rotor at this point. Such ring of sealing liquid, however, does not shut off opening 34 against flow of vapors of gases upwardly therethrough. The rate of discharge through openings 36 is to some extent self-adjusting, increasing with increase in the supply of reflux due to increase of centrifugal force with increasing depth of liquid on member 31.

Liquid discharged outwardly through openings 36 collects in the housing 13 and flows through a trapped pipe 62 into conduit 21 and so back to the still.

To facilitate the flow of reflux to the inlet of pipe 62, I prefer to place such inlet below the outer edge of the bottom of member 31 and to utilize the centrifugal force in such liquid to concentrate it largely near the outer side of the housing 13. For this purpose, I employ a ring 63 of sheet metal having a cylindrical flange portion fixed to the inner face of housing 13 and an inclined portion running upwardly and inwardly from said cylindrical flange and spaced from member 31. Ring 63 is so placed that its inclined part intersects the horizontal plane through the opening 36. Therefore, liquid discharged from such opening strikes the underface of the inclined housing 13, until it reaches and enters the outlet pipe 62. The bottom of housing 13 is preferably formed to drain to outlet pipe 62. It is evident that, so far as collection of liquid is concerned, I may substitute a trough for the member 31. However, member 31 also prevents the escape of vapor and balances to a great extent the pressure inside and outside the rotor 10.

The vapors from the still passing through the passageway and through openings 34 into space 53 are assisted in their movement by centrifugal force coupled with the action of the fans 35 which largely balances the centrifugal force urging the vapors in a reverse direction and hence the static pressure of the vapors from the still, although small, is sufficient to drive them through the rotor.

The pressure inside housing 13 around rotor 10 tends to build up due to leakage of vapors flowing around the top of conduit 21 and so equalizes the pressures within the rotor to some extent. If desired, a gas under pressure may be admitted to the interior of housing 13 through valved pipe 64, or such pipe may be used as a vent. The accumulation of non-condensable gases within the stationary housing 13 produces a desirable insulating effect. It is sometimes desirable to introduce air, nitrogen, carbon dioxide or other non-condensable gas into the housing 13 through pipe 64 for such insulating purposes.

As described above, housing 13 affords a convenient support for the drive mechanism. By making the top plate 23 of housing 13 removable and normally bolting it in place, all the moving parts of the apparatus may be removed as a unit for inspection and repair. The revolving rotor casing comprising plate 28, shell 32 and member 34 presents a smooth outer surface permitting high speed operation of rotor 10 without undue friction with vapors and interference with entrance and exit of liquid and vapor through the spiral passageway 27.

Figure 5:
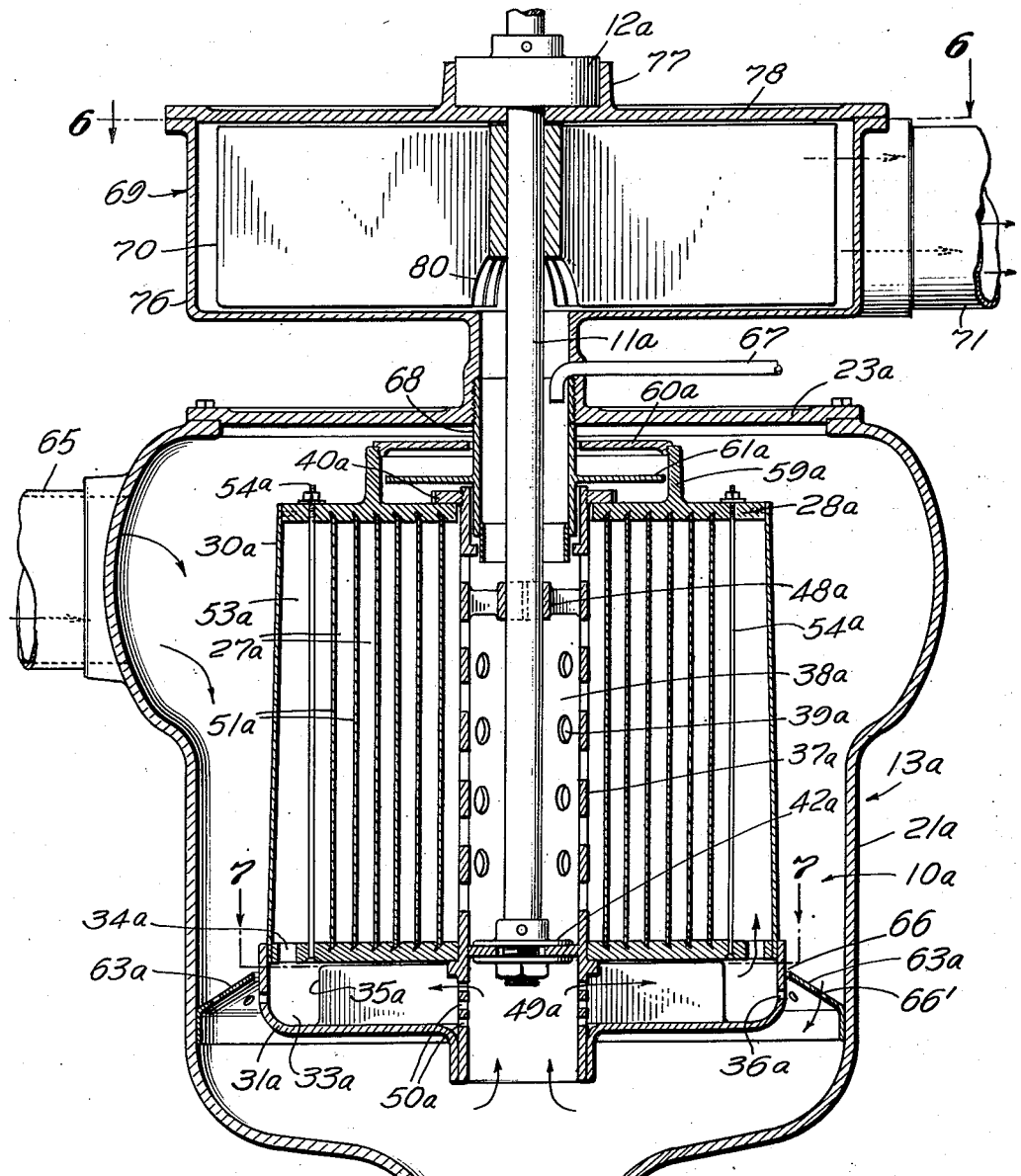
Fig. 5 is a longitudinal, vertical sectional view through a modified form of the invention especially adapted for air conditioning and absorption of gases, wherein, for example, a counter-current contact between a gas or vapor and a liquid is effected.

While my apparatus is generally designed to effect counter-current contact of fluids of different densities such as gases or vapors and liquids, in the embodiment of my invention shown in Figs. 5, 6 and 7, I show an apparatus which is particularly suitable for the counter-current contact of a gas and a liquid, for example, in water coolers, air conditioners and gas scrubbers. In instances where the device is to be used as a water cooler, the hot water is introduced into the rotor and is propelled outwardly by centrifugal force, counter-current to a cooling stream of air or gas moving therein. When used as an air conditioner, a cool water is introduced into the rotor and air to be conditioned passes therein counter-current to the conditioning stream of water. In both instances, the apparatus is designed with suitable means such as an exhaust assembly for expelling the lighter treated fluid (air or gas) from the rotor and drawing in the additional air or gas to be treated without the need of the conventional compressing equipment.

The embodiment of my invention can replace the extremely bulky and quite expensive wooden atmospheric cooling towers, spray ponds, and the like. It requires only a very limited space and can be located at any convenient spot while atmospheric air or other gases to be treated can be drawn in through suitable ducts from any desired point. The saturated air discharged from this apparatus can be used to improve ventilation and heating, which advantage is not available with most other commercial types of water cooling apparatus.

Referring to Figs. 5, 6 and 7, it will be noted that the parts similar in construction to those described in Figs. 1, 2 and 3 have been given like reference numerals with the suffix "a" appended thereto in order to facilitate the description thereof. The adaptation of the device previously described for use as a water cooler, will be readily apparent from the following description.

In this embodiment of my invention, the housing 13a is provided with an inlet 65 through which cool, low humidity air is drawn or urged into the upper expanded portion of the housing. The cool air is forced downwards in the housing 13a and is caused to follow the path defined by the shell 21a of the housing and the shell 30a of the rotor 10a. The air then flows through the annular space 66 between the plate 63a and the rotor member 31a, and the openings 66, and enters the lower chamber 49a of the hub 37a. From chamber 49a it passes through the openings 50a into chamber 33a, thence through the opening 34a and thus into the inlet or outer space 53a to the spiral passageway 27a. As in Figs. 1-4, the movement of the air through the chamber 33a is assisted by the impeller or booster blades 35a.

The air is then caused to flow through the spiral passageway 27a of the rotor 10a and passes through the openings 39a into chamber 38a of the hub 37a. During the passage of the cool air through the spiral passageway 27a, it is brought into highly effective counter-current contact with the hot water to be cooled.

The hot water is introduced through the heavy fluid inlet 67 into the upper end of inner chamber 38a of the hub 37a. This inlet extends into a tubular stationary conduit 68 which is secured in a fluid-tight manner to cover 23a at an axial opening therein, and is in substantial alignment with hub 37a. The lower end of conduit 68 extends into and is spaced from the upper end of hub 37a, defining therewith a space leading into the liquid seal. The upper end of member 68 provides a support for an exhaust assembly 69 consisting of a stationary casing and rotatable exhaust fans 70 therein mounted on shaft 11a. An outlet 71 is provided for conducting the fluids from the exhaust assembly.

The hot water from inlet 67 passes through the stationary conduit 68 and into the chamber 38a. Here, under the influence of centrifugal force set up by the rotation of rotor 10a, it is urged through the perforations 39a of hub 37a and outwardly in a film through the spiral passageway 27a in counter-current contact with the cooled air. During this counter-current contact of the fluids, the warm water is cooled and the cool, low humidity air is in turn warmed and saturated with water.

The warmed air, as it emerges from the spiral passageway 27a, flows into chamber 38a as hereinabove set forth. It then travels upwardly in chamber 38a, through the stationary conduit 68 and into the exhaust assembly 69, from which it is propelled by the exhaust fans 70 through the outlet 71. From the outlet, the warm air may be discharged or may be conducted to any desirable place for use.

The cooled water leaving the spiral passageway 27a flows down the passageway 53a between the casing 30a and the outer turn of sheet 51a and drops through the openings 34a into the member 31a. It is then urged through the openings 36a by centrifugal force and into the bottom of housing 13a. As stated in the description of Figs. 1-4 above, the openings 36a are made sufficiently large to permit the cooled water to be discharged therethrough, and at the same time are small enough to prevent leakage of appreciable amounts of cooled air flowing thereby. It is, of course, to be understood that the amount of liquid entering the system is proportioned to the amount of lighter fluid entering, in order to provide adequate treatment of the liquid or lighter fluid and prevent flooding of the system.

The cooled water flowing out of the openings 36a passes into the housing 13a and drains into a float chamber 72 secured in any desired manner to the bottom of the housing. The water accumulates in the float chamber 72 to a level sufficiently high to lift the float 73 and thereby lift the valve 74 from its seat. The cooled water is then permitted to drain through outlet 75 and from there flows to the place of use.

The exhaust assembly 69 may suitably comprise a shallow cylindrical casing 76, removably secured in any suitable manner to the stationary conduit 68. The casing top is provided with a central opening through which the shaft 11ª extends into the radial thrust bearing 12ª, which is illustrated in this instance as supported by the cover 78 of the casing 76 within an upstanding concentric boss 77 formed thereon.

It is apparent that a continuous passageway is provided from the central chamber 38ª of hub 37ª through the stationary conduit 68 to the casing 76. The fan blades 70 are secured to a central hub 79 (Fig. 6) which is fastened to shaft 11ª so to rotate therewith. The lower end of the fan blades may be cut back, as at 80, to avoid obstruction to the flow of fluid from conduit 68 to casing 76.

The above described modification may be used as a gas scrubber, water cooler, or as an air conditioner wherein the treated lighter fluid, (air or gas) is to be recirculated. However, where recirculation of the treated fluid is not desired, a further modification shown in Fig. 8 may be employed.

In this form of my invention the apparatus is designed preferably for outdoor air-conditioning installation wherein a lighter fluid (air) to be treated is brought into intimate contact with a treating fluid (cool water) by a counter-current flow of the fluids. The inlet duct 65 is dispensed with and much of the walls of the housing 13ª is perforated or is replaced by coarse screens 81. These screens can be formed of any desirable non-corrosive material such as copper, Monel metal, stainless steel or the like. In an installation of this character, the walls defining the spiral passageway 27ª need not be formed with the precise spacing and pitch necessary in obtaining close fractionation in a fractional distillation process, and a coarser spacing or pitch may be employed. In this manner, the volumetric capacity of the apparatus is increased and the initial cost of construction materially reduced.

It is to be understood that the apparatus shown in Figs. 5–8 can be operated by a suitable source of power such as a motor which drives the shaft 11ª in the manner already described.

As set forth above, the rotor may be subdivided into rotor sections and suitable provision made for the uniform distribution of reflux liquid into the sections so formed. This form of my invention is shown in Figures 9 and 10. As is apparent from an inspection of these figures, reflux liquid is uniformly supplied to each of the rotor sections to insure an adequate supply of reflux liquid throughout the rotor so that a uniform and more efficient counter-current contact between the vapor to be treated and the reflux liquid is effected in all parts of the rotor.

Referring to Figs. 9 and 10, it will be noted that the parts similar in construction to those described in Figs. 1–3 have been given like reference numerals with the suffix "X" appended thereto to facilitate the description thereof.

In this embodiment of my invention, the mixed vapors from the still enter the space 49X from the conduit 21X and pass through the openings 50X into passageway 33X. The vapors are urged through passageway 33X by centrifugal force, in a manner already described, and then through openings 34X to the outer end of the spiral passageways 82, 83 and 84 of the rotor 10X. The passageways 82, 83 and 84 are formed between the circular end plates 28X and 29X by means of spirally wound sheets 85, 86 and 87 respectively and intermediate spacing members 88 and 89. The joints between the sheet 85, the end member 28X and the spacing member 88; sheet 86 and spacing members 88 and 89; and sheet 87, spacing member 89 and end plate 29X are similar in design and construction to the joints between the spirally wound sheets and end plates of the embodiments of my invention already described. It is thus apparent that the spacing members 88 and 89 sub-divide the rotor 10X into sections. Although I have shown a rotor consisting of three rotor sections, my invention is not to be construed as limited thereto as a greater or lesser number of rotor sections may be employed to obtain the desired uniform counter-current action between the vapors and reflux throughout the rotor.

The vapors at the outer end of the spiral passageways 82, 83 and 84 pass therethrough against the centrifugal force set up by rotation and counter-current to heavier fluid or reflux, and into the space 38X and out through conduit 24X. The hub member 37X is provided with a plurality of openings 90 to facilitate the egress of the vapors from the passageways 82, 83 and 84. As stated above, some of the vapors will, in general, condense in the passageways of the rotor to form reflux liquid and additional reflux may be formed in outlet 24X or in a reflux condenser to which such conduit delivers; however, I prefer to supply reflux liquid directly to each of the passageways in the rotor sections.

In this embodiment of my invention, I preferably employ a seal of the stationary recess type although it is obvious that the apparatus can be readily designed to utilize a rotating recess seal as described in the other embodiments of my invention. The seal, in this instance, is formed outside of the housing 13X and comprises a liquid seal chamber formed by a recessed boss 94 secured to the cover plate 23X of the housing 13X and a cover plate 95 formed integral with the outlet conduit section 24X and secured to the boss 94. A rotatable disk or vane 96 extends into the seal chamber substantially centrally thereof. Vane 96 is adapted to be rotated by and with the rotor 10X as by a sleeve 97 which couples the vane to the rotor. Except for the reversal of the parts, this seal operates in substantially the same manner as the seal shown in the other embodiments of my invention.

The reflux liquid is introduced through the inlet conduit 91 into a rotatable reflux distributing chamber 92. This chamber may suitably comprise a bottom member 93 keyed to shaft 11X and a confining wall member 98 secured to member 93. The top walls of member 98 are inclined towards the shaft 11X to prevent the egress of the reflux liquid from chamber 92 during the operation of the device. Member 93 is provided with openings 99 through which reflux liquid is delivered by gravity to distributing conduits 100, 101 and 102 which in turn directly deliver the reflux to the spiral passageways 82, 83 and 84 respectively. In this manner a positive supply of reflux liquid is delivered to each rotor section to insure a uniform counter-current contact action between the vapor and reflux in all parts of the rotor. Whirl promoting vanes, 103 are formed integral with member 98, within chamber 92, to assist in keeping the reflux liquid in motion and thus prevent the collection of foreign matter such as rust and the like in the openings 99. As an added precaution against accumulation of foreign matter in openings 99, suitable guard members 104 may be formed over these openings. These guard members are provided with a suitable opening through which communication is established between chamber 92 and the distributing conduits.

Aside from the above modification the operation of this device is similar to the operation of the device described in connection with Figs. 1-4.

While my invention has been described herein before in connection with distilling operations, water cooling and air conditioning, it is readily apparent that it is also applicable to other operations in which counter-current contact between vapors and liquid are desired; for example, an absorption process for removing constituents from natural gas or other gases, by absorption in oil or other liquids, in processes wherein constituents of gases are removed by chemical action, as in the removal of hydrogen sulphide from gases by contact with alkali solutions, such as solutions of soda ash, triethanolamine and the like. The invention may also be employed in processes where counter-current contact between liquids of different densities, which are more or less immiscible with one another, is desired; for example, in solvent processes for removing constituents of lubricating oils and the like and the chemical refining of hydrocarbon oils with sulphuric acid, alkalis or the like. In these instances suitable means are provided for the introduction of the heavier and lighter liquids in the rotor.

Although the present invention has been described in connection with details of specific apparatus and processes for carrying the same into effect, it is to be understood that these are not to be regarded as limitations upon the scope of the invention, except in so far as included in the accompanying claims.

I claim:

1. In apparatus for effecting counter-current exchange between fluids of different densities, a rotor adapted to rotate on a vertical axis having a central opening, a spirally wound sheet forming a spiral passageway extending from said opening outwardly of the rotor, a casing forming part of the rotor and spaced from the outermost turn of said sheet to provide an opening to said spiral passageway, said casing being flared downward to facilitate discharge of liquid from the rotor, a stationary housing surrounding the rotor and means to rotate the rotor within the housing.

2. In apparatus for effecting counter-current exchange between fluids of different densities, a rotor having a spiral passageway, a casing surrounding said passageway and rotating therewith, means for rotating said rotor, means forming a passageway for conducting a relatively heavy fluid to the inner entrance of the spiral passageway, means forming a second passageway for conducting a relatively lighter fluid to the outer entrance of said spiral passageway, the heavier of said fluids being urged through said spiral passageway counter-currently to the lighter fluid due to centrifugal force set up by the rotation of the rotor, means forming an outlet from said rotor for said first-mentioned fluid and means forming an outlet from said rotor for the second mentioned fluid, said first named outlet comprising means cooperating with the first named fluid to prevent the second named fluid from by-passing the outer entrance of said spiral passageway and a stationary casing surrounding said rotating casing.

3. In apparatus for effecting counter-current exchange between a liquid and a lighter fluid, a rotor having a spirally wound conduit of rectangular cross-section, a casing surrounding said conduit and forming with the outer turn thereof an entrance to the outer end of the conduit for said lighter fluid, said casing being flared downwardly away from the axis of rotation of the rotor, means forming a passageway leading to the inner end of the conduit through which the liquid is adapted to pass, and means communicating with the entrance to the outer end of the conduit through which the lighter fluid is adapted to pass, a stationary housing surrounding the rotor and means to rotate the rotor within the housing.

4. In apparatus for effecting counter-current exchange between a liquid and a lighter fluid, a rotor having a spirally wound conduit of rectangular cross-section, a casing surrounding said conduit and forming with the outer turn thereof an entrance to the outer end of the conduit for said lighter fluid, said casing being flared downwardly away from the axis of rotation of the rotor, means forming a passageway leading to the inner end of the conduit through which the lighter fluid is adapted to pass, said means being provided with a discharge port through which the liquid is adapted to be expelled from the rotor, a stationary housing surrounding the rotor and means to rotate the rotor within the housing.

5. In apparatus for effecting counter-current exchange between a liquid and a lighter fluid, a rotor having a convolutely wound conduit of rectangular cross-section, a casing surrounding said conduit and forming with the outer turn thereof an entrance to the outer end of the conduit for said lighter fluid, said casing being flared downwardly away from the axis of rotation of the rotor, means forming a passageway leading to the inner end of the conduit through which the lighter fluid is adapted to pass, said means having impeller blades therein to assist the movement of the lighter fluid therein and having a discharge port through which the liquid is adapted to be expelled from the rotor, a stationary housing surrounding the rotor and means to rotate the rotor within the housing.

6. In apparatus for effecting counter-current exchange between a liquid and a lighter fluid, a rotor having a convolutely wound conduit of rectangular cross-section, a casing surrounding said conduit and forming with the outer turn thereof an entrance to the outer end of the conduit for said lighter fluid, means forming a passageway leading to the inner end of the conduit through which the liquid is adapted to pass, and means communicating with the entrance to the outer end of the conduit through which the lighter fluid is adapted to pass, a stationary housing surrounding the rotor, means forming a passageway which connects the passageway leading to the inner end of the conduit to the outside of the rotor, a liquid seal within the housing formed on said rotor and rotatable therewith, and means to rotate the rotor within the housing.

7. In apparatus for effecting counter-current exchange between fluids of different densities, a rotor having a cylindrical casing, means forming a passageway of increasing radius within the casing, said means being spaced from said casing and being formed to provide a central opening into which the inner end of the passageway opens, the outer end opening into the space within the casing to form therewith an outer opening for said passageway, and means forming a passageway communicating with the outer opening, said means being provided with an inlet substantially coaxial with said central opening, means for rotating the rotor, means for supplying a heavier fluid within the passageway of increasing radius and means for forcing a lighter fluid through the passageway communicating with the outer opening to cause it to pass through said opening and inwardly through the passageway of increasing radius and a stationary housing surrounding said rotor.

8. In apparatus for effecting counter-current exchange between fluids of different densities, a rotor having a cylindrical casing, means forming a passageway of increasing radius within the casing, said means being spaced from said casing and being formed to provide a central opening into which the inner end of the passageway opens, the outer end opening into the space within the casing to form therewith an outer opening for said passageway, and means forming a passageway communicating with the outer opening, said means being provided with an inlet substantially coaxial with said central opening and having discharge ports adjacent the outer opening and a stationary housing surrounding said rotor.

9. In apparatus for effecting counter-current exchange between fluids of different densities, a rotor having a cylindrical casing, means forming a passageway of increasing radius within the casing, said means being spaced from said casing and being formed to provide a central opening into which the inner end of the passageway opens, the outer end opening into the space within the casing to form therewith an outer opening for said passageway, means forming a passageway communicating with the outer opening and means forming a liquid seal communicating with the central opening, means for rotating the rotor, means for supplying a heavier fluid within the passageway of increasing radius and means for forcing a lighter fluid through the passageway communicating with the outer opening to cause it to pass through said opening and inwardly through the passageway of increasing radius and a stationary housing surrounding said rotor.

10. In apparatus for effecting counter-current exchange between fluids of different densities, a rotor having a cylindrical casing, means forming a passageway of increasing radius within the casing, said means being spaced from said casing and being formed to provide a central opening into which the inner end of the passageway opens, the outer end opening into the space within the casing to form therewith an outer opening for said passageway, means forming a passageway communicating with the outer opening, said means being provided with an inlet substantially coaxial with said central opening and having discharge ports adjacent the outer opening, and means forming a liquid seal communicating with the central opening, means for rotating the rotor, means for supplying a heavier fluid within the passageway of increasing radius and means for forcing a lighter fluid through the passageway communicating with the outer opening to cause it to pass through said opening and inwardly through the passageway of increasing radius and a stationary housing surrounding said rotor.

11. In apparatus for effecting counter-current exchange between fluids of different densities, a rotor having a cylindrical casing, a passageway of increasing radius having inner and outer opening within the casing, a central opening with which the inner opening of the passageway communicates, means forming a passageway communicating with the outer opening and means forming an exhaust mechanism communicating with the central opening, means for rotating the rotor, means for supplying a heavier fluid within the passageway of increasing radius and means for forcing a lighter fluid through the passageway communicating with the outer opening to cause it to pass through said opening and inwardly through the passageway of increasing radius and a stationary housing surrounding said rotor.

12. In apparatus for effecting counter-current exchange between fluids of different densities, a rotor having a cylindrical casing, a passageway of increasing radius having inner and outer openings within the casing, a central opening with which the inner opening of the passageway communicates, means forming a passageway communicating with the outer opening, means forming an exhaust mechanism communicating with the central opening and means forming a liquid seal intermediate the central opening and the exhaust mechanism, means for rotating the rotor, means for supplying a heavier fluid within the passageway of increasing radius and means for forcing a lighter fluid through the passageway communicating with the outer opening to cause it to pass through said opening and inwardly through the passageway of increasing radius and a stationary housing surrounding said housing.

13. In apparatus for effecting counter-current exchange between a liquid and a lighter fluid, a rotor having a convolutely wound conduit of rectangular cross-section, a casing surrounding said conduit and forming with the outer turn thereof an entrance to the outer end of the conduit for said lighter fluid, said casing be'ng flared downwardly away from the axis of rotation of the rotor, means forming a passageway leading to the inner end of the conduit through which the liquid is adapted to pass, and means communicating with the entrance to the outer end of the conduit through which the lighter fluid is adapted to pass, said means having impeller blades therein to assist the movement of the lighter fluid therein and having a discharge port through which the liquid is adapted to be discharged from the rotor, a stationary housing surrounding the rotor, means forming a passageway which connects the passageway leading to the inner end of the conduit to the outside of the rotor, a liquid seal within the housing formed on said rotor and rotatable therewith, and means to rotate the rotor within the housing.

14. In apparatus for effecting counter-current exchange between a liquid and a lighter fluid, a stationary housing, a vertically disposed rotor within the housing suspended by and rotating with a rotatable shaft, said rotor comprising a hollow perforated hub, a strip member convolutely wound about said hub to form a spiral passageway of increasing radius having a rectangular cross-section, a casing surrounding the strip member and forming therewith an outer passageway to said spiral passageway, means forming a chamber at the lower extremity of the rotor which communicates with the outer passageway leading to said spiral passageway and through which the lighter fluid is adapted to pass, said means having impeller blades therein to assist the movement of the lighter fluid therethrough and a discharge port for the liquid which passes out of the spiral passageway counter-currently to the lighter fluid entering therein and means forming a liquid seal chamber secured to the rotor within the housing, a conduit, for the passage of fluids, leading from the upper extremity of the rotor and through the seal and forming a passageway between the hollow hub and the outside of the stationary housing, and means to rotate said shaft.

15. In apparatus for effecting counter-current movement between a liquid and a lighter fluid, a stationary housing, a vertically disposed rotor having a hollow perforated hub, spaced end plates through which said hub extends, a strip member wound about said hub to form a spiral passageway of increasing radius having a rectangular longitudinal cross-section, said strip member being secured in a fluid-tight manner to the opposed faces of the end plates, a casing surrounding the strip member and forming therewith an outer passageway to said spiral passageway, said casing being secured to the peripheries of the end plates, means forming a chamber with one end plate at the lower extremity of the rotor which communicates with the outer passageway leading to said spiral passageway and through which the lighter fluid is adapted to pass, said means having impeller blades therein to assist the movement of the lighter fluid therethrough and a discharge port for the liquid which passes out of the spiral passageway counter-currently to the lighter fluid entering therein and means forming a liquid seal chamber secured to the rotor within the housing, a conduit, for passage of fluids, leading from the upper extremity of the rotor and forming a passageway between the hollow hub and the outside of the stationary housing, said conduit having an annular extension into said liquid seal chamber, and means to rotate said shaft.

16. In apparatus for effecting counter-current movement between a liquid and a lighter fluid, a rotor having a convolutely wound conduit of rectangular cross-section, a casing surrounding said conduit and forming with the outer turn thereof an entrance to the outer end of the conduit for said lighter fluid, means forming a passageway leading to the inner end of the conduit through which the liquid is adapted to pass, and means communicating with the entrance to the outer end of the conduit through which the lighter fluid is adapted to pass, a stationary housing surrounding the rotor, means forming a passageway which connects the passageway leading to the inner end of the conduit to the outside of the rotor, a liquid seal within the housing formed on said rotor and rotatable therewith, an inlet for the liquid, and means to rotate the rotor within the housing.

17. An apparatus for effecting counter-current movement between a liquid and a lighter fluid, a rotor having a convolutely wound conduit of rectangular cross-section, a casing surrounding said conduit and forming with the outer turn thereof an entrance to the outer end of the conduit for said lighter fluid, means forming a passageway leading to the inner end of the conduit through which the liquid is adapted to pass, and means communicating with the entrance to the outer end of the conduit through which the lighter fluid is adapted to pass, a stationary housing surrounding the rotor, an exhaust assembly having rotatable fan blades, a stationary conduit extending through the housing and forming a passageway establishing communication between the inner end of the conduit and the exhaust assembly, a liquid seal within the housing formed on said rotor and rotatable therewith, an inlet for the liquid between the exhaust assembly and the liquid seal and means to rotate the rotor and the fan blades of the exhaust assembly.

18. In apparatus for effecting counter-current movement between a liquid and a lighter fluid, a stationary housing, a vertically disposed rotor within the housing suspended by and rotating with a rotatable shaft, said rotor having a hollow perforated hub, a strip member convolutely wound about said hub to form a spiral passageway of increasing radius and having a rectangular longitudinal cross-section, a casing surrounding the strip member and forming therewith an outer passageway to said spiral passageway and means forming a chamber at the lower extremity of the rotor which communicates with the outer passageway leading to said spiral passageway and through which the lighter fluid is adapted to pass, said means having impeller blades therein to assist the movement of the lighter fluid therethrough and a discharge port for the liquid which passes out of the spiral passageway counter-currently to the lighter fluid entering therein, an exhaust assembly positioned above the housing and having rotatable fan blades therein, a stationary conduit, for the passage of fluids, leading from the upper extremity of the rotor and forming a passageway between the hub and the exhaust assembly, a liquid seal within the housing formed on said rotor and rotatable therewith, an inlet for the liquid located between the exhaust assembly and the liquid seal and means to rotate the rotor and the fan blades of the exhaust assembly.

19. The apparatus set forth in claim 17 in which part of the stationary housing is perforated.

20. The apparatus set forth in claim 17 in which part of the walls of the stationary housing is formed of a reticulated material to permit the entry of the light fluid to the rotor.

21. The apparatus set forth in claim 18 in which part of the walls of the stationary housing is formed of a coarse screen to permit the entry of air to the rotor.

22. A rotor comprising spaced end members having grooves in the opposed faces, said grooves having a substantially V-shape and being defined by walls which slope with respect to the axis of rotation of said rotor and a convolutely wound sheet between the end members, the lateral edges of said sheet extending into said grooves towards the apices thereof and forming a fluid-tight joint with the walls thereof.

23. A rotor comprising spaced end members having grooves in the opposed faces, said grooves having a substantially V-shape and being defined by walls which slope away from the axis of rotation of said rotor, the wall farthest removed from the axis of rotation forms an angle of substantially 10° with a line drawn parallel to the axis of rotation and a convolutely wound sheet having its lateral edges urged into the opposed grooves towards the apices thereof whereby the sheet is secured by a fluid-tight joint to the end members.

24. In apparatus for effecting counter-current exchange between fluids of different densities, a rotor having a cylindrical casing, means forming a plurality of passageways of increasing radius within the casing, said means being formed to provide a central opening into which the inner ends of the passageways open, the outer ends opening into the space within the casing to provide outer openings and means forming a passageway communicating with said outer openings and a stationary housing surrounding said rotor.

25. In apparatus for effecting counter-current exchange between fluids of different densities, a rotor having a cylindrical casing, means forming a plurality of passageways of increasing radius within the casing, said means being formed to provide a central opening into which the inner ends of the passageways open, the outer ends opening into the space within the casing to provide outer openings, means forming a passageway communicating with said outer openings through which the lighter fluid is adapted to pass and means forming passageways communicating with the inner openings through which the heavier fluid is adapted to pass and a stationary housing surrounding said rotor.

26. In apparatus for effecting counter-current exchange between fluids of different densities, a rotor having a cylindrical casing, means forming a plurality of passageways of increasing radius within the casing, said means being formed to provide a central opening into which the inner ends of the passageways open, the outer ends opening into the space within the casing to provide outer openings, means forming a passageway communicating with said outer openings through which the lighter fluid is adapted to pass and means forming passageways communicating with the inner openings through which the heavier fluid is adapted to pass, said last named means being rotatable with said rotor and a stationary housing surrounding said rotor.

27. In apparatus for effecting counter-current exchange between fluids of different densities, a rotatable shaft, a rotor fixed to said shaft and having a cylindrical casing, means forming a plurality of passageways of increasing radius within the casing, said means being spaced from said casing and being formed to provide a central opening into which the inner ends of the passageways open, the outer ends opening into the space within the casing to provide outer openings, means forming a passageway communicating with said outer openings through which the lighter fluid is adapted to pass, a liquid distributing chamber secured to said shaft and into which the heavier fluid is adapted to be introduced and conduits connecting the distributing chamber with the inner ends of each of said passageways and a stationary housing surrounding said rotor.

28. In apparatus for effecting counter-current exchange between fluids of different densities, a rotatable shaft, a rotor fixed to said shaft, means forming a plurality of passageways of increasing radius within the rotor, means through which a lighter fluid may be introduced to the outer ends of said passageways and means through which a heavier fluid may be introduced to each of the inner ends of said passageways and a stationary housing surrounding said rotor.

29. In apparatus for effecting counter-current exchange between fluids of different densities, a vertically disposed rotatable shaft, a rotor adapted to rotate on a vertical axis fixed to said shaft, means forming a plurality of passageways of increasing radius within the rotor, means through which a lighter fluid may be introduced to the outer ends of said passageways and means through which a heavier fluid may be introduced to each of the inner ends of said passageways and a stationary housing surrounding said rotor.

30. A rotor having spaced end members having grooves in their opposed faces, said grooves being substantially V-shaped and having one wall which slopes with respect to the axis of rotation of the rotor and a sheet wound between the members to form a passage, the edges of said sheet extending into said grooves towards the apices thereof and engaging the sloping walls thereof, thereby forming fluid-tight joints therewith.

31. In a passageway-forming device, spaced members having opposed grooves in their opposed faces and strip members extending between said opposed faces and entering said grooves, said grooves having a substantially V-shape and having a wall which slopes in respect of the strip members, the edges of said strip members engaging the sloping walls of said grooves and being distorted thereby toward their apices, thereby forming a fluid-tight joint with the walls thereof.

32. In apparatus for effecting counter-current exchange between fluids of different densities, a rotor having a cylindrical casing, means forming a passageway of increasing radius within the casing, said means being spaced from said casing and being formed to provide a central opening into which the inner end of the passageway opens, the outer end opening into the space within the casing to provide an outer opening, and means forming an inlet passageway communicating with the outer opening, said means having impeller blades therein to assist the movement of the lighter fluid therethrough and being provided with a substantially axial inlet, means for rotating the rotor, means for supplying a heavier fluid within the passageway of increasing radius and means for forcing a lighter fluid into the inlet passageway communicating with the outer opening to cause it to pass through said inlet passageway with the aid of the impeller blades, whereby the lighter fluid is forced to pass through said outer opening and inwardly through the passageway of increasing radius and a stationary housing surrounding said rotor.

WALTER J. PODBIELNIAK.

CERTIFICATE OF CORRECTION.

Patent No. 2,209,577. July 30, 1940.

WALTER J. PODBIELNIAK.

It is hereby certified that error appears in the printed specification of the above numbered patent requiring correction as follows: Page 5, first column, line 19, for the word "end" read --ends--; page 7, second column, line 35, claim 12, for the word "housing" read --rotor--; and that the said Letters Patent should be read with this correction therein that the same may conform to the record of the case in the Patent Office.

Signed and sealed this 10th day of September, A. D. 1940.

(Seal)

Leslie Frazer,
Acting Commissioner of Patents.